United States Patent
Bickham et al.

(10) Patent No.: US 9,995,873 B2
(45) Date of Patent: Jun. 12, 2018

(54) SINGLE-MODE LARGE EFFECTIVE AREA OPTICAL FIBERS

(71) Applicant: Corning Incorporated, Corning, NY (US)

(72) Inventors: Scott Robertson Bickham, Corning, NY (US); Dana Craig Bookbinder, Corning, NY (US); Ming-Jun Li, Horseheads, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days. days.

(21) Appl. No.: 15/658,813

(22) Filed: Jul. 25, 2017

(65) Prior Publication Data
US 2018/0031760 A1    Feb. 1, 2018

Related U.S. Application Data

(60) Provisional application No. 62/368,513, filed on Jul. 29, 2016.

(51) Int. Cl.
*G02B 6/036* (2006.01)
*G02B 6/02* (2006.01)

(52) U.S. Cl.
CPC ....... *G02B 6/02009* (2013.01); *G02B 6/0365* (2013.01)

(58) Field of Classification Search
CPC .................. G02B 6/02009; G02B 6/0365
See application file for complete search history.

(56) References Cited

U.S. PATENT DOCUMENTS

| | | |
|---|---|---|
| 5,410,567 A | 4/1995 | Brundage et al. |
| 5,715,346 A | 2/1998 | Liu |
| 5,781,684 A | 7/1998 | Liu |
| 6,027,062 A | 2/2000 | Bacon et al. |
| 6,611,647 B2 | 8/2003 | Berkey et al. |
| 6,904,218 B2 | 6/2005 | Sun et al. |
| 7,187,833 B2 | 3/2007 | Mishra |
| 7,555,187 B2 | 6/2009 | Bickham et al. |
| 7,565,820 B2 | 7/2009 | Foster et al. |
| 7,832,675 B2 | 11/2010 | Bumgarner et al. |
| 8,041,127 B2 | 10/2011 | Sillard et al. |
| 8,218,929 B2 | 7/2012 | Bickham et al. |

(Continued)

OTHER PUBLICATIONS

Jonas Weiss, et al., "Optical Interconnects for Disaggregated Resources in Future Datacenters", ECOC 2014, Cannes-France, 3 pgs.

(Continued)

*Primary Examiner* — Sung Pak
(74) *Attorney, Agent, or Firm* — John P. McGroarty; Svetlana Z. Short

(57) ABSTRACT

Optical fibers having a large effective area are disclosed. Three main embodiments of the optical fiber allow for single-mode operation at wavelengths of 850 nm, 980 nm and 1060 nm, respectively and have a large effective area with low bend losses. The large effective area optical fiber is expected to be particularly useful for data center applications due to its ability to efficiently optically couple with photonic integrated devices. Integrated systems and optical communication systems that employ the optical fibers are also disclosed.

30 Claims, 3 Drawing Sheets

(56) References Cited

U.S. PATENT DOCUMENTS

| | | |
|---|---|---|
| 8,687,932 B2 | 4/2014 | Peckham et al. |
| 8,724,937 B2 | 5/2014 | Barwicz et al. |
| 9,477,037 B1 | 10/2016 | Bickham et al. |
| 2004/0218882 A1 | 11/2004 | Bickham et al. |
| 2004/0228593 A1* | 11/2004 | Sun .................... G02B 6/02014 385/127 |
| 2009/0060437 A1* | 3/2009 | Fini .................... G02B 6/03672 385/127 |
| 2010/0027951 A1* | 2/2010 | Bookbinder ......... G02B 6/0365 385/127 |
| 2013/0071079 A1* | 3/2013 | Peckham ........... G02B 6/02019 385/124 |
| 2013/0071080 A1* | 3/2013 | Peckham ........... G02B 6/02019 385/124 |
| 2013/0071081 A1* | 3/2013 | Peckham ........... G02B 6/02019 385/124 |
| 2013/0136408 A1 | 5/2013 | Bookbinder et al. |

OTHER PUBLICATIONS

Tymon Barwicz, et al., "Assembly of Mechanically Compliant Interfaces between Optical Fibers and Nanophotonic Chips", Tymon Barwicz (IBM), et al., Electronic Components & Technology Conference, 2014, . 978-1-4799-2407-3, 2014 IEEE, pp. 179-185.

* cited by examiner

SINGLE-MODE LARGE EFFECTIVE AREA OPTICAL FIBERS

This application claims the benefit of priority under 35 U.S.C. § 119 of U.S. Provisional Application Ser. No. 62/368,513, filed on Jul. 29, 2016, the content of which is relied upon and incorporated herein by reference in its entirety.

FIELD

The present disclosure relates to optical fibers, and in particular, to single-mode large effective area optical fibers.

BACKGROUND

The need for greater bandwidth and higher data transmission rates has motivated efforts to develop next-generation platforms for information storage and delivery. It is widely believed that optical information systems will provide superior performance to today's microelectronics-based systems. Integrated optical systems based on silicon photonics are a leading replacement technology for microelectronic systems. Silicon photonics interfaces with standard CMOS technologies and WDM (wavelength division multiplexing) to convert electrical signals to optical signals, to transmit optical signals, and to reconvert optical signals to electrical signals. In disaggregated systems, transfer of signals between units occurs through optical links that provide high bandwidth and high data transfer rates.

Data centers with disaggregated architecture are being proposed for future data centers, involving use of silicon photonics and WDM technology. While a number of these systems have focused on using multimode optical fibers, system architectures using single-mode fibers are also contemplated. Consequently, there is a need for suitable optical fibers for such data center applications and like applications.

SUMMARY

Optical fibers having a large effective area and that provide a differential advantage to data center applications using single-mode fibers are disclosed. Three different main embodiments of the optical fiber allow for single-mode operation at wavelengths of 850 nm, 980 nm and 1060 nm respectively (as well as wavelength bands that include these wavelengths), and have a large effective area with low bend losses.

An aspect of the disclosure is an optical fiber having a large effective area (e.g., between 30 µm$^2$ and 100 µm$^2$) at an operating wavelength of about 850 nm and still have a cable cutoff wavelength that is less than 820 nm, with the fiber designs having a trench in the cladding region to improve bend performance.

Another aspect of the disclosure is an optical fiber having a large effective area (e.g., between 30 µm$^2$ and 100 µm$^2$) at an operating wavelength of about 980 nm and still have a cable cutoff wavelength that is less than 950 nm, with the fiber designs having a trench in the cladding region to improve bend performance.

Another aspect of the disclosure is an optical fiber having a large effective area (e.g., between 40 µm$^2$ and 110 µm$^2$) at an operating wavelength of about 1060 nm and still have a cable cutoff wavelength that is less than 1030 nm, with the fiber designs having a trench in the cladding region to improve bend performance.

Another aspect of the disclosure is an optical fiber that includes: a core region, said core region having an outer radius $r_1$ in the range from 3.0 to 6.0 microns and a relative refractive index $\Delta_{1max}$ in the range from 0.12% to 0.35%; a depressed index cladding region surrounding said core region, said depressed index cladding region having an outer radius $r_3$ and a relative refractive index $\Delta_3$ less than −0.1%, and a trench volume of at least 20% Δ-micron$^2$; an outer cladding region surrounding said depressed index cladding region, said outer cladding region having an outer radius $r_4$; and wherein said optical fiber has a mode field diameter (MFD) at 850 nm≥6.0 microns, an effective area at 850 nm of at least 30 micron$^2$, a cable cutoff wavelength≤850 nm, and a bending loss at 850 nm, as determined by the mandrel wrap test using a mandrel having a diameter of 15 mm, of ≤1.0 dB/turn.

Another aspect of the disclosure is an integrated system that includes the optical fiber described immediately above and a VCSEL optically coupled to the optical fiber and that emits light at one or more wavelengths between 800 nm and 900 nm.

Another aspect of the disclosure is optical fiber that includes: a core region, said core region having an outer radius $r_1$ in the range from 3.0 to 6.0 microns and a relative refractive index $\Delta_{1max}$ in the range from 0.12% to 0.35%; a depressed index cladding region surrounding said core region, said depressed index cladding region having an outer radius $r_3$, a relative refractive index $\Delta_3$ less than −0.15%, and a trench volume of at least 25% Δ-micron$^2$; an outer cladding region surrounding said depressed index cladding region, said outer cladding region having an outer radius $r_4$; and wherein said optical fiber has a mode field diameter (MFD) at 980 nm≥6.5 microns, a cable cutoff wavelength≤980 nm, an effective area at 980 nm of at least 40 micron$^2$, and a bending loss at 980 nm as determined by the mandrel wrap test using a mandrel having a diameter of 15 mm of ≤1.0 dB/turn.

Another aspect of the disclosure is an integrated system that includes the optical fiber as described immediately above, and a VCSEL optically coupled to the optical fiber and that emits light at one or more wavelengths between 940 nm and 1020 nm.

Another aspect of the disclosure is an optical fiber that includes: a core region, said core region having an outer radius $r_1$ in the range from 3.0 to 6.0 microns and a relative refractive index $\Delta_{1max}$ in the range from 0.12% to 0.35%; a depressed index cladding region surrounding said core region, said depressed index cladding region having a radius $r_3$, a relative refractive index $\Delta_3$ less than −0.1%, and a trench volume of at least 20% Δ-micron$^2$; an outer cladding region surrounding said depressed index cladding region, said outer cladding region having an outer radius $r_4$; and wherein said optical fiber has a mode field diameter (MFD) at 1060 nm≥7.0 microns, a cable cutoff wavelength≤1060 nm, an effective area at 1060 nm of at least 40 micron, and a bending loss at 1060 nm as determined by the mandrel wrap test using a mandrel having a diameter of 15 mm of ≤1.0 dB/turn.

Another aspect of the disclosure is an integrated system that includes the optical fiber as described immediately above, and a VCSEL optically coupled to the optical fiber and that emits light at one or more wavelengths between 1020 and 1100 nm.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Figure 1A:
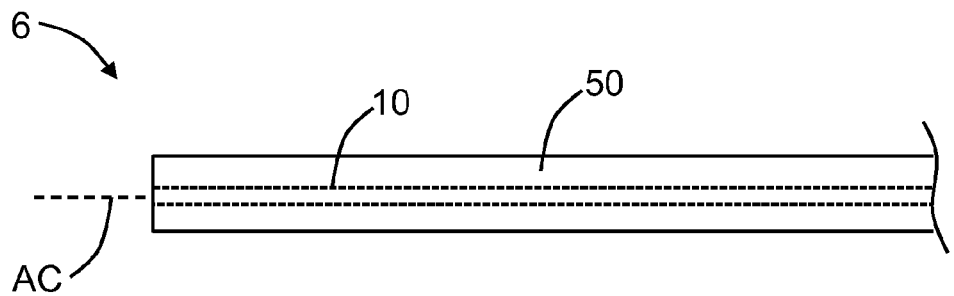
FIG. 1A is a side view and FIG. 1B is a cross-sectional view of an example large effective area optical fiber according to the disclosure.

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Cartesian coordinates are shown in some of the Figures for the sake of reference and are not intended to be limiting as to direction or orientation.

Definitions and Terminology

The "refractive index profile" is the relationship between the refractive index or relative refractive index and the fiber radius r. For relative refractive index profiles depicted herein as having step boundaries between adjacent core and/or cladding regions, normal variations in processing conditions may preclude obtaining sharp step boundaries at the interface of adjacent regions. It is to be understood that although boundaries of refractive index profiles may be depicted herein as step changes in refractive index, the boundaries in practice may be rounded or otherwise deviate from perfect step function characteristics. It is further understood that the value of the relative refractive index may vary with radial position within the core region and/or any of the cladding regions.

When the relative refractive index varies with radial position in a particular region of the fiber (core region and/or any of the cladding regions), it may be expressed in terms of its actual or approximate functional dependence or in terms of an average value applicable to the region. Unless otherwise specified, if the relative refractive index of a region (core region and/or any of the cladding regions) is expressed as a single value, it is understood that the relative refractive index in the region is constant, or approximately constant, and corresponds to the single value or that the single value represents an average value of a non-constant relative refractive index dependence with radial position in the region. Whether by design or a consequence of normal manufacturing variability, the dependence of relative refractive index on radial position may be sloped, curved, or otherwise non-constant.

Thus, the "relative refractive index," as used herein, is defined as:

$$\Delta_i\% = 100\frac{(n_i^2 - n_{ref}^2)}{2n_i^2}$$

where $n_i$ is the maximum refractive index in region i, unless otherwise specified, and $n_{ref}$ is the refractive index of pure silica glass, unless otherwise specified. As used herein, the relative refractive index is represented by Δ (or "delta") or Δ % (or "delta %) or % Δ and its values are given in units of "%", unless otherwise specified. Relative refractive index may also be expressed as Δ(r) or Δ(r) %.

The "alpha parameter" or "α-parameter" or "alpha value" or just "a" refers to a parameter used to define a relative refractive index profile Δ(r) ("alpha profile") that has the following functional form Eq. 3:

$$\Delta(r) = \Delta(r_0)\left[1 - \left[\frac{|r - r_0|}{(r_1 - r_0)}\right]^\alpha\right]$$

where $r_o$ is the point at which Δ(r) is maximum, $r_1$ is the point at which Δ(r) is zero, and r is in the range $r_i \le r \le r_f$, where $r_i$ is the initial point of the α-profile, $r_f$ is the final point of the α-profile, and a is a real number. $\Delta(r_0)$ for an α-profile may be referred to herein as $\Delta_{max}$ or, when referring to a specific region i of the fiber, as $\Delta_{i,max}$.

The "effective area" of an optical fiber is denoted $A_{eff}$ and is defined as:

$$A_{eff} = \frac{2\pi\left[\int_0^\infty (f(r))^2 r dr\right]^2}{\int_0^\infty (f(r))^4 r dr}$$

where f(r) is the transverse component of the electric field of the guided optical signal and r is radial position in the fiber. The effective area $A_{eff}$ depends on the wavelength of the optical signal and is reported herein for wavelengths of 850 nm, 980 nm, 1060 nm and 1550 nm. Specific indication of the wavelength will be made when referring to the effective area $A_{eff}$ herein.

The "mode field diameter" or "MFD" of an optical fiber is determined using the Peterman II method, wherein:

$$MFD = 2w$$

$$w = \left[2\frac{\int_0^\infty (f(r))^2 r dr}{\int_0^\infty \left(\frac{df(r)}{dr}\right)^2 r dr}\right]^{1/2}$$

where f(r) is the transverse component of the electric field distribution of the guided optical signal and r is radial position in the fiber. The MFD depends on the wavelength of the optical signal and is reported herein for wavelengths of 850 nm, 980 nm, 1060 nm and 1550 nm. Specific indication of the wavelength will be made when referring to an effective area $\Delta_{eff}$.

"Trench volume" $V_{Trench}$ is defined in Eq. 6 as:

$$V_{Trench} = |2\int_{r_{Trench,inner}}^{r_{Trench,outer}} \Delta_{Trench}(r) r \, dr| \qquad \text{Eq. 6}$$

where $r_{Trench,inner}$ is the inner radius of the trench region of the refractive index profile, $r_{Trench,outer}$ is the outer radius of the trench region of the refractive index profile, $\Delta_{Trench}(r)$ is the relative refractive index of the trench region of the refractive index profile, and r is radial position in the fiber. Trench volume is a positive quantity and will be expressed herein in units of % $\Delta$-$\mu m^2$, which may also be expressed as % $\Delta\mu m^2$ or % $\Delta$micron$^2$, or % $\Delta$-micron$^2$.

The "chromatic dispersion" D of an optical fiber is referred to as "dispersion" herein unless otherwise noted and is the sum of the material dispersion, the waveguide dispersion, and the intermodal dispersion. In the case of single mode waveguide fibers, the inter-modal dispersion is zero. Dispersion values in a two-mode regime assume intermodal dispersion is zero. The zero dispersion wavelength ($\lambda_0$) is the wavelength at which the dispersion has a value of zero. The dispersion slope DS is the rate of change of dispersion with respect to wavelength.

The cutoff wavelength of an optical fiber is the minimum wavelength at which the optical fiber will support only one propagating mode. For wavelengths below the cutoff wavelength, multimode transmission may occur and an additional source of dispersion may arise to limit the fiber's information carrying capacity. The cutoff wavelength is reported herein as a fiber cutoff wavelength or a cable cutoff wavelength. The fiber cutoff wavelength is based on a 2-meter fiber length and the cable cutoff wavelength is based on a 22-meter cabled fiber length. The 22-meter cable cutoff wavelength is typically less than the 2-meter cutoff wavelength due to higher levels of bending and mechanical pressure in the cable environment.

The bend resistance of an optical fiber may be gauged by bend-induced attenuation under prescribed test conditions. Various tests are used in the art to assess bending losses in fibers. For purposes of the present disclosure, bending losses BL are determined by a mandrel wrap test. In the mandrel wrap test, the fiber is wrapped around a mandrel having a specified diameter and the increase in attenuation due to the bending (relative to a straight fiber) at a particular wavelength is determined. Attenuation in the mandrel wrap test is expressed in units of dB/turn, where one turn refers to one revolution of the fiber about the mandrel.

The fibers disclosed herein generally include a core region and a cladding region surrounding the core region, as explained in greater detail below. The fibers may also include a primary coating surrounding the cladding region, and a secondary coating surrounding the primary coating. The cladding region may include an inner cladding region and an outer cladding region. The cladding may further include a depressed index cladding region. The depressed index cladding region is a cladding region having a lower relative refractive index than adjacent inner and/or outer cladding regions. The depressed index cladding region may also be referred to herein as a trench or trench region. The depressed index cladding region may surround the inner cladding region and/or may be surrounded by the outer cladding region. The refractive index profile of the core region may be designed to minimize attenuation losses while maintaining a large mode field diameter for the fiber. The primary and secondary coatings may be selected to protect the mechanical integrity of the core and cladding and to minimize the effects of external mechanical disturbances on the characteristics of the optical signal guided in the fiber. The primary and secondary coatings may insure that losses due to bending and other perturbing forces are minimized. The depressed index cladding region may also contribute to a reduction in bending losses.

Whenever used herein, radius $r_1$ and relative refractive index $\Delta_1(r)$ refer to the core region, radius $r_2$ and relative refractive index $\Delta_2(r)$ refer to the inner cladding region, radius $r_3$ or $R_3$ and relative refractive index $\Delta_3(r)$ refer to the depressed index cladding region or "trench" region, and radius $r_4$ and relative refractive index $\Delta_4(r)$ refer to the outer cladding region.

It is understood that the central core region is substantially cylindrical in shape and that the surrounding inner cladding, depressed index cladding, and outer cladding regions are substantially annular in shape. Annular regions may be characterized in terms of an inner radius and an outer radius. Radial positions $r_1$, $r_2$, $r_3$ and $r_4$ (or $R_1$, $R_2$, $R_3$ and $R_4$) refer herein to the outermost radii of the central core region, inner cladding region, depressed index cladding region, outer cladding region, respectively.

When two regions are directly adjacent to each other, the outer radius of the inner of the two regions coincides with the inner radius of the outer of the two regions. In one embodiment, for example, the fiber includes a depressed index cladding region surrounded by and directly adjacent to an outer cladding region. In such an embodiment, the radius $r_3$ or $R_3$ corresponds to the outer radius of the depressed index cladding region and the inner radius of the outer cladding region.

As will be described further hereinbelow, the relative refractive indices $\Delta$ of the central core region, inner cladding region, depressed index cladding region, and outer cladding region may differ and typically do differ. Each of the regions may be formed from silica glass or a silica-based glass. Variations in refractive index may be accomplished by incorporating updopants or downdopants at levels known to provide a targeted refractive index or refractive index profile using techniques known to those of skill in the art.

Updopants are dopants that increase the refractive index of the glass relative to the undoped glass composition. Downdopants are dopants that decrease the refractive index of the glass relative to the undoped glass composition. In one embodiment, the undoped glass is pure silica glass. When the undoped glass is pure silica glass, updopants include Cl, Br, Ge, Al, P, Ti, Zr, Nb, and Ta, and downdopants include F and B. Regions of constant refractive index may be formed by not doping or by doping at a uniform concentration. Regions of variable refractive index may be formed through non-uniform spatial distributions of dopants.

Example large effective area optical fibers as disclosed herein are set forth in Tables 1A, 2A and 3A, 1B, 2B and 3B, and 1C, 2C and 3C below. The Tables set forth a number of the above-described parameters, as well as the following parameters, which are known in the art: The dispersion D, measured in ps/nm/km, the dispersion slope DS, measured in ps/nm$^2$/km; the LP11 mode cut-off, measured in nm; the lateral load LL, measured in dB/km; the pin array PA, measured in dB; the core LP11 cutoff, measured in nm; the core MFD, measured in µm; and the cable cutoff, measured in nm.

Also in the Tables, the values for the radius r are measured in µm, the MFD is measured in µm, the effective area $\Delta_{eff}$ is measured in µm$^2$, the dispersion D is measured in ps/nm/km, and the trench volume $V_{Trench}$ is measured in % $\Delta$-µm$^2$. The bend loss is denoted BL and is measured in dB/turn.

Example Large Effective Area Optical Fibers

Optical fibers that provide a differential advantage to data center applications using single-mode fibers are disclosed. The fibers allow single-mode operation at wavelengths close to 850 nm or 980 nm or 1060 nm and have large effective area with low bend losses.

Figure 1B:
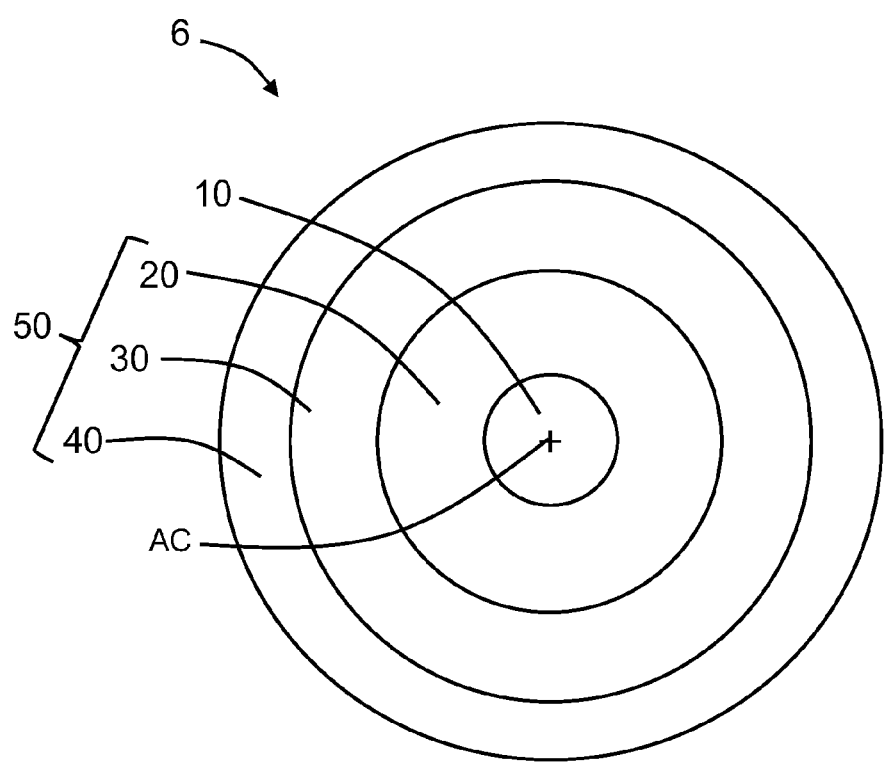

FIG. 1A is a side view and FIG. 1B is a cross-sectional view of an example large effective area optical fiber 6 (hereinafter, "fiber") according to the disclosure. The fiber 6 includes a central axis AC, central core region 10, an optional inner cladding region 20, a third region 30 in the form of a trench and thus referred to as "trench region" 30 or "depressed cladding region," and a fourth region 40 making up an outer cladding and thus referred to as an "outer cladding region" 40. The optional inner cladding 20, the trench region 30, and the outer cladding region 40 collectively define a cladding section 50.

Figure 2:
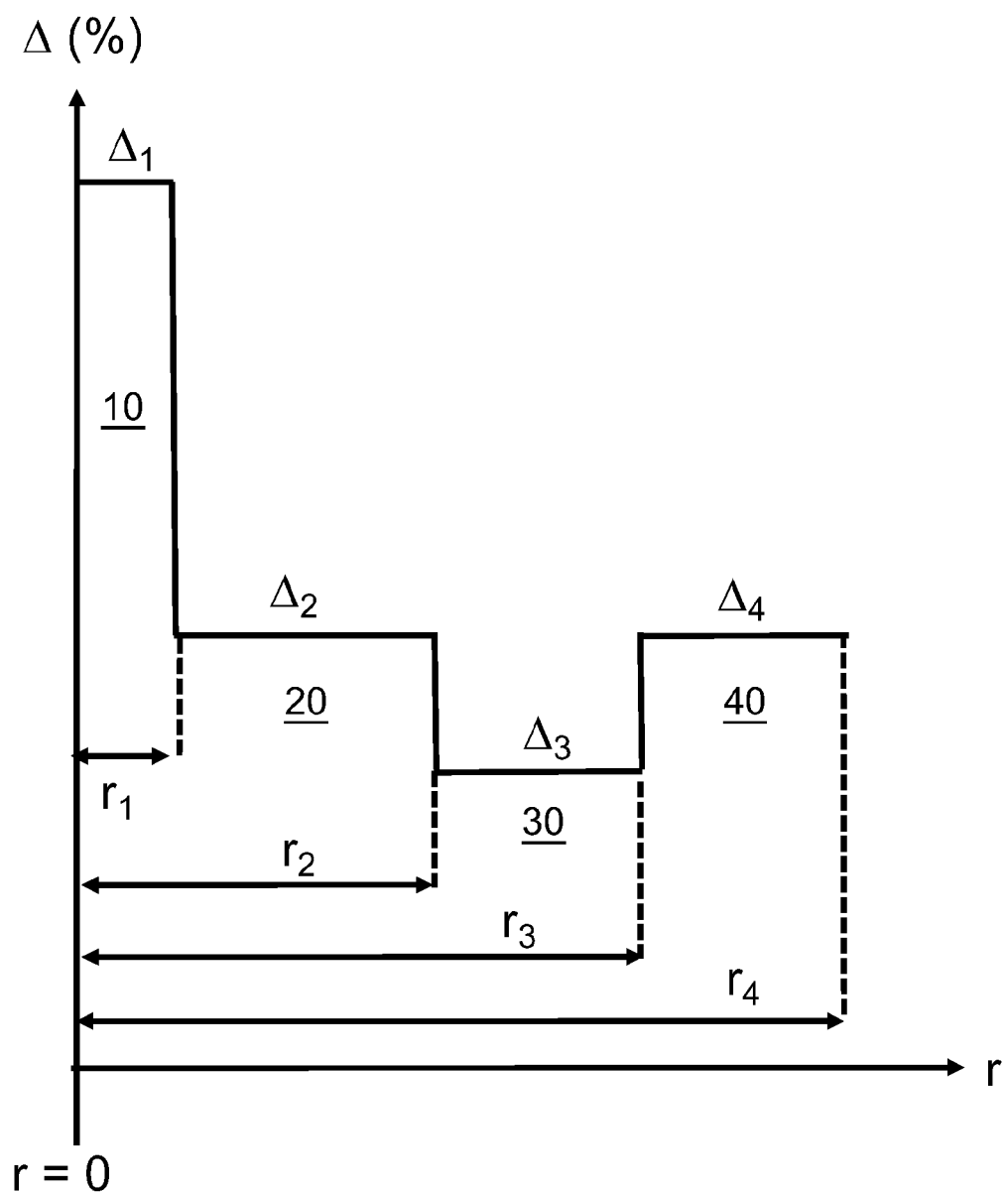
FIG. 2 is a plot of the relative refractive index profile of the large effective area optical fiber of FIG. 1.

FIG. 2 is a plot of the relative refractive index profile Δ(%) versus fiber radius r of the fiber 6 of FIG. 1. The plot is from the central axis AC radially outward, i.e., from R=0. The core region 10 has outer radius $r_1$ and relative refractive index $\Delta_1$. The inner cladding region 20 extends from the radial position $r_1$ to a radial position $r_2$ and has relative refractive index $\Delta_2$. The trench region 30 extends from the radial position $r_2$ to a radial position $r_3$ and has relative refractive index $\Delta_3$. The outer cladding region 40 extends from the radial position $r_3$ to radial position $r_4$ and has relative refractive index $\Delta_4$.

In the profile of FIG. 2, the trench region 30 in the cladding may have a constant refractive index that is less than the refractive indices of the inner cladding region 20 and the outer cladding region 40. Core region 10 has the highest relative refractive index in the profile. The core region 10 may include a lower index region at or near the centerline (known in the art as a "centerline dip") (not shown). It should be noted that the inner cladding region 20 is optional and may be eliminated as noted hereinabove. When inner cladding region 20 is missing, depressed index region 30 is directly adjacent core region 10.

The relative ordering of relative refractive indices $\Delta_1$, $\Delta_2$, $\Delta_3$, and $\Delta_4$ satisfy the conditions $\Delta_1 > \Delta_4 > \Delta_3$ and $\Delta_1 > \Delta_2 > \Delta_3$. The values of $\Delta_2$ and $\Delta_4$ may be equal or either may be greater than the other, but both $\Delta_2$ and $\Delta_4$ are between $\Delta_1$ and $\Delta_3$.

The core and cladding regions of fiber 6 may be produced in a single-step process or multi-step process by methods which are well known in the art. Suitable methods include: the double crucible method, rod-in-tube procedures, and doped deposited silica processes, also commonly referred to as chemical vapor deposition ("CVD") or vapor phase oxidation. A variety of CVD processes are known and are suitable for producing the core and cladding layer used in the coated optical fibers of the present invention. They include external CVD processes, axial vapor deposition processes, modified CVD (MCVD), inside vapor deposition, and plasma-enhanced CVD (PECVD).

The glass portion of the coated fibers may be drawn from a specially prepared, cylindrical preform which has been locally and symmetrically heated to a temperature sufficient to soften the glass, e.g., a temperature of about 2000° C. for a silica glass. As the preform is heated, such as by feeding the preform into and through a furnace, a glass fiber is drawn from the molten material. See, for example, U.S. Pat. Nos. 7,565,820; 5,410,567; 7,832,675; and 6,027,062; the disclosures of which are hereby incorporated by reference herein, for further details about fiber making processes.

Example A

Tables 1A through 3A below set forth design parameters for an Example A of fiber 6 that has an operating wavelength λ of about 850 nm (between 30 μm² and 75 μm²) and still have a cable cutoff wavelength that is less than 820 nm. Tables 1A through 3A set forth a number of exemplary profile examples EX 1A through EX 7A, EX 8A through EX 14A, and EX 15A through EX 21A, respectively, with a trench 30, with the fibers having large effective area, a cable cutoff of less than 1030 nm and low bend losses.

In some embodiments, the effective area $A_{\it eff}$ at 850 nm is between 30 μm² and 75 μm², in other embodiments the effective area $A_{\it eff}$ at 850 nm is between 40 μm² and 75 μm², and in still other embodiments the effective area $A_{\it eff}$ at 850 nm is between 50 μm² and 70 μm².

In some embodiments the trench volume $V_{Trench}$ is between 10% Δ-μm² and 80% Δ-μm², in other embodiments the trench volume $V_{Trench}$ is between 20% Δ-μm² and 70% Δ-μm², and in still other embodiments the trench volume $V_{Trench}$ is between 30% Δ-μm² and 60% Δ-μm².

In some embodiments the lateral load loss LL at 850 nm is less than 0.1 dB/km, in other embodiments the lateral load loss LL at 850 nm is less than 0.05 dB/km, and in still other embodiments the lateral load loss LL at 850 nm is less than 0.02 dB/km. In some embodiments the pin-array loss PA at 850 nm is less than 3 dB, in other embodiments the pin-array loss PA at 850 nm is less than 2 dB, in still other embodiments the pin-array loss PA at 850 nm is less than 1 dB and in yet another embodiment the pin-array loss PA at 850 nm is less than 0.5 dB.

TABLE 1A

| Parameter | Example 1A | Example 2A | Example 3A | Example 4A | Example 5A | Example 6A | Example 7A |
|---|---|---|---|---|---|---|---|
| $\Delta_1$ (% Δ) | 0.33 | 0.3 | 0.27 | 0.24 | 0.21 | 0.18 | 0.15 |
| $r_1$ (microns) | 3.35 | 3.5 | 3.7 | 3.9 | 4.2 | 4.5 | 4.95 |
| α | 12 | 12 | 12 | 12 | 12 | 12 | 12 |
| $\Delta_2$ (% Δ) | 0.00 | 0.00 | 0.00 | 0.00 | 0.00 | 0.00 | 0.00 |
| $r_2$ (microns) | 10 | 10 | 10 | 10 | 10 | 10 | 10 |
| $\Delta_3$ (% Δ) | 0.00 | 0 | 0 | 0 | 0 | 0 | 0 |
| $r_3$ (microns) | 16 | 16 | 16 | 16 | 16 | 16 | 16 |
| $\Delta_4$ (% Δ) | 0.00 | 0.00 | 0.00 | 0.00 | 0.00 | 0.00 | 0.00 |
| $r_4$ (microns) | 62.5 | 62.5 | 62.5 | 62.5 | 62.5 | 62.5 | 62.5 |
| MFD @ 850 nm | 6.24 | 6.54 | 6.9 | 7.31 | 7.83 | 8.43 | 9.26 |
| MFD @ 1550 nm | 10.94 | 11.5 | 12.11 | 12.88 | 13.72 | 14.88 | 16.27 |
| $A_{\it eff}$ @ 850 nm | 31.3 | 34.2 | 38.2 | 42.7 | 49.2 | 57.0 | 68.73 |
| $A_{\it eff}$ @ 1550 nm | 88.8 | 98.0 | 108.7 | 123.0 | 139.2 | 164.0 | 196.21 |
| D @ 850 nm | −89.80 | −89.39 | −88.8 | −88.34 | −87.71 | −87.25 | −86.67 |
| D @ 1550 nm | 10.22 | 11.21 | 12.33 | 13.3 | 14.47 | 15.44 | 16.56 |

TABLE 1A-continued

| Parameter | Example 1A | Example 2A | Example 3A | Example 4A | Example 5A | Example 6A | Example 7A |
|---|---|---|---|---|---|---|---|
| DS @ 850 nm | 0.3960 | 0.3960 | 0.397 | 0.396 | 0.397 | 0.397 | 0.397 |
| DS @ 1550 nm | 0.0597 | 0.0602 | 0.0606 | 0.0612 | 0.06 | 0.0621 | 0.063 |
| LP11 Cutoff | 947 | 943 | 946 | 940 | 947 | 939 | 943 |
| LL @ 850 nm | 0.0004 | 0.0013 | 0.0032 | 0.0056 | 0.0077 | 0.0078 | 0.014 |
| LL @ 1550 nm | 5.26 | 8.44 | 14.09 | 29.64 | 71.7 | 337 | 3779 |
| Pin Array @ 850 nm | 0.028 | 0.066 | 0.165 | 0.306 | 0.416 | 0.411 | 0.687 |
| Pin Array @ 1550 nm | 188 | 240 | 294 | 375 | 449 | 569 | 691 |
| Core LP11 cutoff | 947 | 943 | 946 | 940 | 947 | 939 | 943 |
| Core MFD @ 850 nm | 6.24 | 6.54 | 6.9 | 7.31 | 7.83 | 8.43 | 9.26 |
| Cable Cutoff | 797 | 793 | 796 | 790 | 797 | 789 | 793 |
| $V_{Trench}$ | 0.0 | 0.0 | 0.0 | 0.0 | 0 | 0 | 0 |
| 10 mm BL @ 850 nm | 0.2 | 0.3 | 0.5 | 1.1 | 2 | 7 | 28 |
| 15 mm BL @ 850 nm | 0.0038 | 0.007 | 0.013 | 0.031 | 0.074 | 0.257 | 1 |
| 20 mm BL @ 850 nm | 0.00009 | 0.0002 | 0.0003 | 0.0009 | 0.0023 | 0.009 | 0.046 |
| 30 mm BL @ 850 nm | 0.000003 | 0.00001 | 0.000016 | 0.00005 | 0.0002 | 0.0008 | 0.0059 |

TABLE 2A

| Parameter | Example 8A | Example 9A | Example 10A | Example 11A | Example 12A | Example 13A | Example 14A |
|---|---|---|---|---|---|---|---|
| $\Delta_1$ (% $\Delta$) | 0.33 | 0.3 | 0.27 | 0.24 | 0.21 | 0.18 | 0.15 |
| $r_1$ (microns) | 3.10 | 3.25 | 3.45 | 3.65 | 3.9 | 4.2 | 4.75 |
| $\alpha$ | 12 | 12 | 12 | 12 | 12 | 12 | 12 |
| $\Delta_2$ (% $\Delta$) | 0.00 | 0.00 | 0.00 | 0.00 | 0.00 | 0.00 | 0.00 |
| $r_2$ (microns) | 10 | 10 | 10 | 10 | 10 | 10 | 10 |
| $\Delta_3$ (% $\Delta$) | −0.15 | −0.15 | −0.15 | −0.15 | −0.15 | −0.15 | −0.15 |
| $r_3$ (microns) | 16 | 16 | 16 | 16 | 16 | 16 | 16 |
| $\Delta_4$ (% $\Delta$) | 0.00 | 0.00 | 0.00 | 0.00 | 0.00 | 0.00 | 0.00 |
| $r_4$ (microns) | 62.5 | 62.5 | 62.5 | 62.5 | 62.5 | 62.5 | 62.5 |
| MFD @ 850 nm | 6.06 | 6.35 | 6.71 | 7.11 | 7.6 | 8.19 | 9.06 |
| MFD @ 1550 nm | 10.73 | 11.13 | 11.54 | 12.04 | 12.59 | 13.21 | 13.86 |
| $A_{eff}$ @ 850 nm | 29.0 | 31.9 | 35.7 | 40.1 | 45.8 | 53.2 | 65.54 |
| $A_{eff}$ @ 1550 nm | 85.2 | 91.7 | 98.7 | 107.5 | 117.7 | 130.3 | 144.75 |
| D @850 nm | −91.26 | −90.58 | −89.77 | −89.1 | −88.3 | −87.67 | −86.6 |
| D @1550 nm | 12.72 | 13.93 | 15.15 | 16.26 | 17.32 | 18.27 | 19.32 |
| DS @ 850 nm | 0.3940 | 0.3940 | 0.395 | 0.396 | 0.397 | 0.398 | 0.399 |
| DS @ 1550 nm | 0.0698 | 0.0688 | 0.0675 | 0.0663 | 0.065 | 0.063 | 0.0616 |
| LP11 Cutoff | 859 | 857 | 860 | 856 | 851 | 844 | 860 |
| LL @ 850 nm | 0.0015 | 0.0034 | 0.0038 | 0.011 | 0.016 | 0.024 | 0.0216 |
| LL @ 1550 nm | 4.09 | 5.464 | 7.28 | 10.76 | 17.06 | 31.22 | 63.88 |
| Pin Array @ 850 nm | 0.096 | 0.234 | 0.258 | 0.807 | 1.219 | 1.837 | 1.45 |
| Pin Array @ 1550 nm | 211.00 | 250 | 287 | 345.28 | 412 | 500 | 557 |
| Core LP11 cutoff | 878 | 878 | 884 | 881 | 881 | 878 | 876 |
| Core MFD @ 850 nm | 6.06 | 6.35 | 6.72 | 7.12 | 7.61 | 8.21 | 9.3 |
| Cable Cutoff | 794 | 794 | 800 | 797 | 797 | 794 | 792 |
| $V_{Trench}$ | −23.40 | −23.40 | −23.40 | −23.40 | −23.40 | −23.40 | −23.40 |
| 10 mm BL @ 850 nm | 0.047 | 0.08 | 0.14 | 0.31 | 0.75 | 2.36 | 17.88 |
| 15 mm BL @ 850 nm | 0.0012 | 0.0021 | 0.0041 | 0.01 | 0.026 | 0.09 | 0.84 |
| 20 mm BL @ 850 nm | 0.00003 | 0.00006 | 0.0001 | 0.0003 | 0.0009 | 0.0034 | 0.040 |
| 30 mm BL @ 850 nm | 0.000003 | 0.00001 | 0.00001 | 0.000042 | 0.00015 | 0.0008 | 0.016 |

TABLE 3A

| Parameter | Example 15A | Example 16A | Example 17A | Example 18A | Example 19A | Example 20A | Example 21A |
|---|---|---|---|---|---|---|---|
| $\Delta_1$ (% $\Delta$) | 0.33 | 0.3 | 0.27 | 0.24 | 0.21 | 0.18 | 0.15 |
| $r_1$ (microns) | 2.95 | 3.1 | 3.25 | 3.45 | 3.7 | 4 | 4.35 |
| $\alpha$ | 12 | 12 | 12 | 12 | 12 | 12 | 12 |
| $\Delta_2$ (% $\Delta$) | 0.00 | 0.00 | 0.00 | 0.00 | 0.00 | 0.00 | 0.00 |
| $r_2$ (microns) | 10 | 10 | 10 | 10 | 10 | 10 | 10 |
| $\Delta_3$ (% $\Delta$) | −0.25 | −0.25 | −0.25 | −0.25 | −0.25 | −0.25 | −0.25 |
| $r_3$ (microns) | 16 | 16 | 16 | 16 | 16 | 16 | 16 |
| $\Delta_4$ (% $\Delta$) | 0.00 | 0.00 | 0.00 | 0.00 | 0.00 | 0.00 | 0.00 |
| $r_4$ (microns) | 62.5 | 62.5 | 62.5 | 62.5 | 62.5 | 62.5 | 62.5 |
| MFD @ 850 nm | 5.96 | 6.26 | 6.58 | 6.98 | 7.47 | 8.05 | 8.77 |
| MFD @1550 nm | 10.74 | 11.09 | 11.49 | 11.9 | 12.35 | 12.86 | 13.44 |
| $A_{eff}$ @ 850 nm | 27.8 | 30.7 | 33.9 | 38.2 | 43.7 | 51.0 | 60.48 |
| $A_{eff}$ @ 1550 nm | 85.7 | 91.3 | 98.2 | 105.7 | 114.3 | 124.6 | 137.43 |
| D @850 nm | −92.30 | −91.47 | −90.77 | −89.92 | −89 | −88.11 | −87.22 |
| D @1550 nm | 13.57 | 14.8 | 15.96 | 17.099 | 18.17 | 19.15 | 19.97 |

TABLE 3A-continued

| Parameter | Example 15A | Example 16A | Example 17A | Example 18A | Example 19A | Example 20A | Example 21A |
|---|---|---|---|---|---|---|---|
| DS @ 850 nm | 0.3920 | 0.3930 | 0.394 | 0.395 | 0.396 | 0.398 | 0.399 |
| DS @ 1550 nm | 0.0737 | 0.0722 | 0.0707 | 0.0691 | 0.067 | 0.0654 | 0.0621 |
| LP11 Cutoff | 819 | 819 | 813 | 811 | 810 | 806 | 794 |
| LL @ 850 nm | 0.0017 | 0.0059 | 0.0108 | 0.0047 | 0.0224 | 0.003 | 0.0241 |
| LL @ 1550 nm | 4.00 | 5.05 | 6.81 | 9.27 | 13.32 | 21.404 | 42.82 |
| Pin Array @ 850 nm | 0.125 | 0.47 | 0.932 | 0.369 | 1.997 | 0.251 | 2.02 |
| Pin Array @ 1550 nm | 227.00 | 258.92 | 306 | 352.81 | 406.81 | 481 | 615 |
| Core LP11 cutoff | 837 | 839 | 834 | 835 | 838 | 838 | 832 |
| Core MFD @ 850 nm | 5.96 | 6.26 | 6.58 | 6.99 | 7.48 | 8.08 | 8.83 |
| Cable Cutoff | 796 | 798 | 793 | 794 | 797 | 797 | 791 |
| $V_{Trench}$ | −39.0 | −39.0 | −39.0 | −39.0 | −39.0 | −39.0 | −39.0 |
| 10 mm BL @ 850 nm | 0.021 | 0.036 | 0.072 | 0.155 | 0.377 | 1.185 | 5.605 |
| 15 mm BL @ 850 nm | 0.00056 | 0.001 | 0.0022 | 0.0051 | 0.014 | 0.048 | 0.267 |
| 20 mm BL @ 850 nm | 1.51E−05 | 2.9E−05 | 6.66E−05 | 0.00017 | 0.00049 | 0.002 | 0.013 |
| 30 mm BL @ 850 nm | 2.49E−06 | 5.51E−06 | 1.49E−05 | 4.59E−05 | 0.00017 | 0.0009 | 0.0085 |

The optical fiber 6 according to Example A can have one or more of the following properties.

In an example, outer radius $r_1$ is in the range from 3.0 to 5.0 microns and the relative refractive index $\Delta_1$ is in the range from 0.15% to 0.3%.

In an example, the outer radius $r_3$ is in the range from 12 to 20 microns, the relative refractive index $\Delta_3$ is less than −0.1%, and the trench volume is at least 20% $\Delta\mu m^2$.

In an example, the outer radius $r_4$ is at least 60 microns and the relative refractive index $\Delta_4$ is in the range from −0.05% to 0.10%.

In an example, fiber 6 has an effective area at 850 nm of at least 40 micron².

In an example, inner cladding region 20 has an outer radius $r_2$ in the range from 5 to 20 microns and a relative refractive index $\Delta_2$ in the range from −0.10% to 0.20%, with the depressed cladding index region 30 surrounding the inner cladding region.

In an example, the inner cladding region 20 has an outer radius $r_2$ in the range from 7 to 15 microns and a relative refractive index $\Delta_2$ in the range from −0.05% to 0.10%.

In an example, the outer radius $r_3$ of the trench region 30 is in the range from 12 to 20 microns, the relative refractive index $\Delta_3$ is less than −0.1%, and the trench volume is at least 20% Δ-micron².

In an example, the outer radius $r_4$ of the outer cladding region 40 is at least 60 microns and said relative refractive index $\Delta_4$ is in the range from −0.05% to 0.10%.

In an example, the bend loss BL at 850 nm and for a 10 mm mandrel is less than or equal to than 28 dB/turn or less than or equal to 7 dB/turn. In another example, the bend loss BL at 850 nm and for a 15 mm mandrel is less than or equal to than 1 dB/turn. Also in an example, the bend loss BL at 850 nm for a 20 mm mandrel is less than or equal to 0.05 dB/turn. Also in an example, the bend loss BL at 850 nm for a 30 mm mandrel is less than or equal to 0.02 dB/turn.

Example B

Tables 1B through 3C below set forth design parameters for an example fiber 6 that has an operating wavelength λ of about 980 nm (between 40 μm² and 100 μm²) and still have cutoff wavelength that is less than 950 nm. Tables 1B through 3B set forth a number of exemplary profile examples EX 1B through EX 7B, EX 8B through EX 14B, and EX 15B through EX 21B, respectively, with a trench 30, with the fibers having large effective area, a cable cutoff of less than 1030 nm and low bend losses.

In some embodiments the effective area $\Delta_{eff}$ at 980 nm is between 30 μm² and 100 μm², in other embodiments the effective area $\Delta_{eff}$ at 980 nm is between 50 μm² and 100 μm², and in still other embodiments the effective area $\Delta_{eff}$ at 980 nm is between 60 μm² and 90 μm².

In some embodiments the trench volume $V_{Trench}$ is between 10% Δ-μm² and 80% Δ-μm², in other embodiments the trench volume $V_{Trench}$ is between 20% Δ-μm² and 70% Δ-μm², and in still other embodiments the trench volume $V_{Trench}$ is between 30% Δ-μm² and 70% Δ-μm².

In some embodiments the lateral load loss LL at 980 nm is less than 0.1 dB/km, in other embodiments the lateral load loss LL at 980 nm is less than 0.1 dB/km, and in still other embodiments the lateral load loss LL at 980 nm is less than 0.05 dB/km. In some embodiments the pin-array loss PA at 850 nm is less than 3 dB, in other embodiments the pin-array loss PA at 980 nm is less than 25 dB, in still other embodiments the pin-array loss PA at 980 nm is less than 1 dB and in yet another embodiment the pin-array loss PA at 980 nm is less than 0.5 dB.

TABLE 1B

| Parameter | Example 1B | Example 2B | Example 3B | Example 4B | Example 5B | Example 6B | Example 7B |
|---|---|---|---|---|---|---|---|
| $\Delta_1$ (% Δ) | 0.33 | 0.3 | 0.27 | 0.24 | 0.21 | 0.18 | 0.15 |
| $r_1$ (microns) | 3.80 | 4 | 4.2 | 4.45 | 4.75 | 5.15 | 5.65 |
| α | 12 | 12 | 12 | 12 | 12 | 12 | 12 |
| $\Delta_2$ (% Δ) | 0.00 | 0.00 | 0.00 | 0.00 | 0.00 | 0.00 | 0.00 |
| $r_2$ (microns) | 10 | 10 | 10 | 10 | 10 | 10 | 10 |
| $\Delta_3$ (% Δ) | 0.00 | 0 | 0 | 0 | 0 | 0 | 0 |
| $r_3$ (microns) | 16 | 16 | 16 | 16 | 16 | 16 | 16 |
| $\Delta_4$ (% Δ) | 0.00 | 0.00 | 0.00 | 0.00 | 0.00 | 0.00 | 0.00 |
| $r_4$ (microns) | 62.5 | 62.5 | 62.5 | 62.5 | 62.5 | 62.5 | 62.5 |
| MFD @ 980 nm | 7.17 | 7.53 | 7.93 | 8.41 | 8.98 | 9.72 | 10.66 |

TABLE 1B-continued

| Parameter | Example 1B | Example 2B | Example 3B | Example 4B | Example 5B | Example 6B | Example 7B |
|---|---|---|---|---|---|---|---|
| MFD @1550 nm | 10.56 | 11.07 | 11.68 | 12.39 | 13.25 | 14.3 | 15.67 |
| $A_{eff}$ @ 980 nm | 41.1 | 45.4 | 50.3 | 56.5 | 64.5 | 75.6 | 90.86 |
| $A_{eff}$ @ 1550 nm | 83.0 | 91.3 | 101.6 | 114.3 | 130.7 | 152.4 | 182 |
| D @980 nm | −48.67 | −48.22 | −47.87 | −47.48 | −47.1 | −46.17 | −46.27 |
| D @1550 nm | 12.95 | 13.84 | 14.58 | 15.37 | 16.17 | 17.04 | 17.86 |
| DS @ 980 nm | 0.2200 | 0.2200 | 0.229 | 0.229 | 0.23 | 0.23 | 0.23 |
| DS @ 1550 nm | 0.0574 | 0.058 | 0.0588 | 0.059 | 0.06 | 0.061 | 0.061 |
| LP11 Cutoff | 1072 | 1075 | 1072 | 1070 | 1068 | 1072 | 1074 |
| LL @ 980 nm | 0.0006 | 0.0017 | 0.002 | 0.0018 | 0.0067 | 0.01 | 0.645 |
| LL @ 1550 nm | 2.28 | 3.61 | 6.37 | 12.44 | 30.1 | 109.3 | 1025 |
| Pin Array @ 980 nm | 0.018 | 0.056 | 0.0655 | 0.0057 | 0.223 | 0.418 | 22.37 |
| Pin Array @ 1550 nm | 73.77 | 100.48 | 142 | 196 | 269 | 357.4 | 476 |
| Core LP11 cutoff | 1072 | 1075 | 1072 | 1070 | 1068 | 1072 | 1074 |
| Core MFD @ 980 nm | 7.17 | 7.53 | 7.93 | 8.41 | 8.98 | 9.72 | 10.66 |
| Cable Cutoff | 922 | 925 | 922 | 920 | 918 | 922 | 924 |
| $V_{Trench}$ | 0.0 | 0.0 | 0.0 | 0.0 | 0 | 0 | 0 |
| 10 mm BL @ 980 nm | 1.04 | 1.72 | 3.23 | 6.76 | 16.26 | 46.65 | 184.22 |
| 15 mm BL @ 980 nm | 0.018 | 0.031 | 0.062 | 0.14 | 0.37 | 1.18 | 5.38 |
| 20 mm BL @ 980 nm | 0.0003 | 0.0006 | 0.0012 | 0.0029 | 0.0084 | 0.03 | 0.16 |
| 30 mm BL @ 980 nm | 0.000001 | 0.000002 | 0.000005 | 0.000014 | 0.000051 | 0.00024 | 0.0018 |

TABLE 2B

| Parameter | Example 8B | Example 9B | Example 10B | Example 11B | Example 12B | Example 13B | Example 14B |
|---|---|---|---|---|---|---|---|
| $\Delta_1$ (% Δ) | 0.33 | 0.3 | 0.27 | 0.24 | 0.21 | 0.18 | 0.15 |
| $r_1$ (microns) | 3.50 | 3.65 | 3.85 | 4.1 | 4.4 | 4.75 | 5.2 |
| α | 12 | 12 | 12 | 12 | 12 | 12 | 12 |
| $\Delta_2$ (% Δ) | 0.00 | 0.00 | 0.00 | 0.00 | 0.00 | 0.00 | 0.00 |
| $r_2$ (microns) | 10 | 10 | 10 | 10 | 10 | 10 | 10 |
| $\Delta_3$ (% Δ) | −0.20 | −0.20 | −0.20 | −0.20 | −0.20 | −0.20 | −0.20 |
| $r_3$ (microns) | 16 | 16 | 16 | 16 | 16 | 16 | 16 |
| $\Delta_4$ (% Δ) | 0.00 | 0.00 | 0.00 | 0.00 | 0.00 | 0.00 | 0.00 |
| $r_4$ (microns) | 62.5 | 62.5 | 62.5 | 62.5 | 62.5 | 62.5 | 62.5 |
| MFD @ 980 nm | 6.95 | 7.28 | 7.67 | 8.13 | 8.69 | 9.35 | 10.16 |
| MFD @1550 nm | 10.32 | 10.74 | 11.17 | 11.66 | 12.21 | 12.83 | 13.52 |
| $A_{eff}$ @ 980 nm | 38.0 | 41.7 | 46.3 | 52.2 | 59.7 | 69.3 | 82.26 |
| $A_{eff}$ @ 1550 nm | 79.2 | 85.7 | 93.2 | 101.8 | 112.2 | 124.5 | 140.22 |
| D @980 nm | −49.90 | −49.43 | −48.82 | −48.14 | −47.45 | −46.73 | −46 |
| D @1550 nm | 14.44 | 15.48 | 16.51 | 17.64 | 18.66 | 19.57 | 20.39 |
| DS @ 980 nm | 0.2270 | 0.2280 | 0.229 | 0.23 | 0.231 | 0.233 | 0.234 |
| DS @ 1550 nm | 0.0667 | 0.0667 | 0.066 | 0.066 | 0.065 | 0.064 | 0.0634 |
| LP11 Cutoff | 961 | 954 | 951 | 950 | 948 | 940 | 929 |
| LL @ 980 nm | 0.0015 | 0.0011 | 0.0063 | 0.011 | 0.0047 | 0.010 | 0.026 |
| LL @ 1550 nm | 1.84 | 2.64 | 3.79 | 5.61 | 8.99 | 16.51 | 38.16 |
| Pin Array @ 980 nm | 0.070 | 0.049 | 0.328 | 0.571 | 0.222 | 0.466 | 1.212 |
| Pin Array @ 1550 nm | 86.71 | 116 | 148 | 185 | 233 | 300.6 | 389 |
| Core LP11 cutoff | 988 | 983 | 983 | 987 | 991 | 990 | 990 |
| Core MFD @ 980 nm | 6.95 | 7.29 | 7.68 | 8.16 | 8.73 | 9.43 | 10.33 |
| Cable Cutoff | 925 | 920 | 920 | 924 | 928 | 927 | 927 |
| $V_{Trench}$ | −31.20 | −31.20 | −31.20 | −31.20 | −31.20 | −31.20 | −31.20 |
| 10 mm BL @ 980 nm | 0.18 | 0.33 | 0.62 | 1.29 | 3.07 | 9.65 | 41.32 |
| 15 mm BL @ 980 nm | 0.0034 | 0.007 | 0.013 | 0.030 | 0.077 | 0.272 | 1.354 |
| 20 mm BL @ 980 nm | 0.00006 | 0.00013 | 0.00028 | 0.00068 | 0.0019 | 0.0077 | 0.044 |
| 30 mm BL @ 980 nm | 0.000001 | 0.000002 | 0.000004 | 0.000011 | 0.00004 | 0.0002 | 0.0018 |

TABLE 3B

| Parameter | Example 15B | Example 16B | Example 17B | Example 18B | Example 19B | Example 20B | Example 21B |
|---|---|---|---|---|---|---|---|
| $\Delta_1$ (% Δ) | 0.33 | 0.3 | 0.27 | 0.24 | 0.21 | 0.18 | 0.15 |
| $r_1$ (microns) | 3.35 | 3.5 | 3.7 | 3.9 | 4.2 | 4.5 | 4.95 |
| α | 12 | 12 | 12 | 12 | 12 | 12 | 12 |
| $\Delta_2$ (% Δ) | 0.00 | 0.00 | 0.00 | 0.00 | 0.00 | 0.00 | 0.00 |
| $r_2$ (microns) | 10 | 10 | 10 | 10 | 10 | 10 | 10 |
| $\Delta_3$ (% Δ) | −0.30 | −0.30 | −0.30 | −0.30 | −0.30 | −0.30 | −0.30 |
| $r_3$ (microns) | 16 | 16 | 16 | 16 | 16 | 16 | 16 |
| $\Delta_4$ (% Δ) | 0.00 | 0.00 | 0.00 | 0.00 | 0.00 | 0.00 | 0.00 |
| $r_4$ (microns) | 62.5 | 62.5 | 62.5 | 62.5 | 62.5 | 62.5 | 62.5 |
| MFD @ 980 nm | 6.85 | 7.18 | 7.57 | 8 | 8.55 | 9.17 | 9.96 |

TABLE 3B-continued

| Parameter | Example 15B | Example 16B | Example 17B | Example 18B | Example 19B | Example 20B | Example 21B |
|---|---|---|---|---|---|---|---|
| MFD @1550 nm | 10.30 | 10.68 | 11.09 | 11.54 | 12.03 | 12.57 | 13.16 |
| $A_{eff}$ @ 980 nm | 36.7 | 40.3 | 44.8 | 50.1 | 57.4 | 66.1 | 78.57 |
| $A_{eff}$ @ 1550 nm | 79.0 | 85.1 | 91.9 | 100.0 | 109.2 | 120.4 | 133.95 |
| D @980 nm | −50.70 | −50.1 | −49.36 | −48.72 | −47.85 | −47.11 | −46.17 |
| D @1550 nm | 14.65 | 15.78 | 16.94 | 17.99 | 19.07 | 19.96 | 20.88 |
| DS @ 980 nm | 0.2260 | 0.2270 | 0.229 | 0.23 | 0.232 | 0.233 | 0.234 |
| DS @ 1550 nm | 0.0696 | 0.0692 | 0.0685 | 0.0678 | 0.067 | 0.0659 | 0.0648 |
| LP11 Cutoff | 922 | 916 | 915 | 906 | 907 | 894 | 888 |
| LL @ 980 nm | 0.0028 | 0.0061 | 0.0052 | 0.013 | 0.019 | 0.012 | 0.039 |
| LL @ 1550 nm | 1.86 | 2.54 | 3.45 | 5.037 | 7.44 | 12.59 | 24.69 |
| Pin Array @ 980 nm | 0.154 | 0.357 | 0.296 | 0.806 | 1.12 | 0.687 | 2.13 |
| Pin Array @ 1550 nm | 97.21 | 124 | 151 | 193 | 232 | 297 | 370.27 |
| Core LP11 cutoff | 947 | 943 | 946 | 940 | 947 | 939 | 943 |
| Core MFD @ 980 nm | 6.86 | 7.19 | 7.58 | 8.03 | 8.6 | 9.27 | 10.17 |
| Cable Cutoff | 928 | 924 | 927 | 921 | 928 | 920 | 924 |
| $V_{Trench}$ | −46.8 | −46.8 | −46.8 | −46.8 | −46.8 | −46.8 | −46.8 |
| 10 mm BL @ 980 nm | 0.08 | 0.15 | 0.27 | 0.63 | 1.50 | 5.30 | 22.82 |
| 15 mm BL @ 980 nm | 0.002 | 0.003 | 0.006 | 0.015 | 0.040 | 0.161 | 0.805 |
| 20 mm BL @ 980 nm | 3.06E−05 | 6.37E−05 | 1.35E−04 | 3.75E−04 | 1.06E−03 | 4.88E−03 | 2.84E−02 |
| 30 mm BL @ 980 nm | 5.73E−07 | 1.39E−06 | 3.44E−06 | 1.18E−05 | 4.14E−05 | 2.62E−04 | 2.19E−03 |

The optical fiber 6 according to Example B can also have one or more of the following properties.

In an example, the outer radius $r_1$ of core 10 is in the range from 3.5 to 5.5 microns and the relative refractive index $\Delta_1$ is in the range from 0.15% to 0.30%.

In an example, the outer radius $r_3$ of trench region 30 in the range from 12 to 20 microns, the relative refractive index $\Delta_3$ is less than −0.15%, and the trench volume is at least 30% $\Delta\mu m^2$.

In an example, the outer radius $r_4$ of the outer cladding region 60 is at least 60 microns and said relative refractive index $\Delta_4$ is in the range from −0.05% to 0.10%.

In an example, fiber 6 has an effective area $\Delta_{eff}$ at 980 nm of at least 50 micron.

In an example, the inner cladding region 20 has an outer radius $r_2$ in the range from 5 to 15 microns and a relative refractive index $\Delta_2$ in the range from −0.10% to 0.20%, with the depressed cladding index region 30 surrounding the inner cladding region.

In an example, the inner cladding region 20 has an outer radius $r_2$ in the range from 7 to 15 microns and a relative refractive index $\Delta_2$ in the range from −0.05% to 0.10%.

In an example, the outer radius $r_3$ of trench region 30 is in the range from 12 to 20 microns, the relative refractive index $\Delta_3$ is less than −0.15%, and the trench volume is at least 30% $\Delta$-micron$^2$.

In an example, the outer radius $r_4$ of the outer cladding region 40 is at least 60 microns and the relative refractive index $\Delta_4$ is in the range from −0.05% to 0.10%.

In an example, the bend loss BL at 980 nm and for a 10 mm mandrel is less than or equal to than 185 dB/turn or less than or equal to 50 dB/turn. In another example, the bend loss BL at 980 nm and for a 15 mm mandrel is less than or equal to than 5.5 dB/turn or less than 1.5 dB/turn, or less than or equal to 1 dB/turn. Also in an example, the bend loss BL at 980 nm for a 20 mm mandrel is less than or equal to 0.05 dB/turn or less than or equal to 0.03 dB/turn. Also in an example, the bend loss BL at 980 nm for a 30 mm mandrel is less than or equal to 0.003 dB/turn or less than or equal to 0.002 dB/turn.

Example C

Tables 1C though 3C below set forth design parameters for an example fiber 6 that has an operating wavelength λ of about 1060 nm (between 40 μm$^2$ and 110 μm) and still have cutoff wavelength that is less than 1030 nm. Tables 1C and 2C set forth a number of exemplary profile examples EX 1C through EX 7C, EX 8C through EX 14C, and EX 15C through EX 21C, respectively, having a trench 30, with the fibers having large effective area, cable cutoff of less than 1030 nm and low bend losses.

In some embodiments the effective area $\Delta_{eff}$ at 1060 nm is between 40 μm$^2$ and 110 μm$^2$, in other embodiments the effective area $\Delta_{eff}$ at 1060 nm is between 65 μm$^2$ and 100 μm$^2$, and in still other embodiments the effective area $\Delta_{eff}$ at 1060 nm is between 75 μm$^2$ and 100 μm$^2$.

In some embodiments the trench volume $V_{Trench}$ is between 10% $\Delta$-μm$^2$ and 100% $\Delta$-μm$^2$, in other embodiments the trench volume $V_{Trench}$ is between 20% $\Delta$-μm$^2$ and 80% $\Delta$-μm$^2$, and in still other embodiments the trench volume $V_{Trench}$ is between 30% $\Delta$-μm$^2$ and 70% $\Delta$-μm$^2$.

In some embodiments the lateral load loss at 1060 nm is less than 2 dB/km, in other embodiments the lateral load loss at 1060 nm is less than 1 dB/km, and in still other embodiments the lateral load loss at 1060 nm is less than 0.05 dB/km. In some embodiments the pin-array loss PA at 1060 nm is less than 40 dB, in other embodiments the pin-array loss PA at 1060 nm is less than 20 dB, in still other embodiments the pin-array loss PA at 1060 nm is less than 10 dB and in yet another embodiment the pin-array loss PA at 1060 nm is less than 1 dB.

TABLE 1C

| Parameter | Example 1C | Example 2C | Example 3C | Example 4C | Example 5C | Example 6C | Example 7C |
|---|---|---|---|---|---|---|---|
| $\Delta_1$ (% Δ) | 0.33 | 0.3 | 0.27 | 0.24 | 0.21 | 0.18 | 0.15 |
| $r_1$ (microns) | 4.10 | 4.3 | 4.55 | 4.8 | 5.15 | 5.55 | 6.1 |
| α | 12 | 12 | 12 | 12 | 12 | 12 | 12 |

TABLE 1C-continued

| Parameter | Example 1C | Example 2C | Example 3C | Example 4C | Example 5C | Example 6C | Example 7C |
|---|---|---|---|---|---|---|---|
| $\Delta_2$ (% $\Delta$) | 0.00 | 0.00 | 0.00 | 0.00 | 0.00 | 0.00 | 0.00 |
| $r_2$ (microns) | 10 | 10 | 10 | 10 | 10 | 10 | 10 |
| $\Delta_3$ (% $\Delta$) | 0.00 | 0 | 0 | 0 | 0 | 0 | 0 |
| $r_3$ (microns) | 16 | 16 | 16 | 16 | 16 | 16 | 16 |
| $\Delta_4$ (% $\Delta$) | 0.00 | 0.00 | 0.00 | 0.00 | 0.00 | 0.00 | 0.00 |
| $r_4$ (microns) | 62.5 | 62.5 | 62.5 | 62.5 | 62.5 | 62.5 | 62.5 |
| MFD @ 1060 nm | 7.76 | 8.14 | 8.59 | 9.09 | 9.74 | 10.51 | 11.53 |
| MFD @1550 nm | 10.49 | 11 | 11.6 | 12.31 | 13.16 | 14.2 | 15.57 |
| $A_{eff}$ @ 1060 nm | 48.1 | 52.9 | 59.0 | 66.0 | 75.8 | 88.3 | 106.0 |
| $A_{eff}$ @ 1550 nm | 82.1 | 90.9 | 101.0 | 113.6 | 129.9 | 151.0 | 182 |
| D @1060 nm | −31.76 | −31.4 | −31 | −30.7 | −30.4 | −30.09 | −29.73 |
| D @1550 nm | 14.56 | 15.2 | 15.96 | 16.54 | 17.26 | 17.9 | 18.6 |
| DS @ 1060 nm | 0.1710 | 0.1720 | 0.172 | 0.173 | 0.173 | 0.173 | 0.174 |
| DS @ 1550 nm | 0.0572 | 0.0579 | 0.0586 | 0.0593 | 5.99E−02 | 0.06 | 0.06 |
| LP11 Cutoff | 1150 | 1155 | 1159 | 1153 | 1157 | 1154 | 1158 |
| LL @ 1060 nm | 0.0001 | 0.0018 | 0.0021 | 0.0042 | 0.0084 | 0.42 | 1.803 |
| LL @ 1550 nm | 1.48 | 2.52 | 4.5 | 9.31 | 23.16 | 90.55 | 951.3 |
| Pin Array @ 1060 nm | 0.002 | 0.0446 | 0.05 | 0.103 | 0.195 | 11.6 | 36.63 |
| Pin Array @ 1550 nm | 39.62 | 59.74 | 86.77 | 131.7 | 187.8 | 271.9 | 381.83 |
| Core LP11 cutoff | 1150 | 1155 | 1159 | 1153 | 1157 | 1154 | 1158 |
| Core MFD @ 1060 nm | 7.76 | 8.14 | 8.59 | 9.09 | 9.74 | 10.51 | 13.17 |
| Cable Cutoff | 1000 | 1005 | 1009 | 1003 | 1007 | 1004 | 1008 |
| $V_{Trench}$ | 0.0 | 0.0 | 0.0 | 0.0 | 0 | 0 | 0 |
| 10 mm BL @ 1060 nm | 1.58 | 2.55 | 4.56 | 9.70 | 22.82 | 68.74 | 2579.53 |
| 15 mm BL @ 1060 nm | 0.038 | 0.065 | 0.123 | 0.283 | 0.727 | 2.452 | 133.715 |
| 20 mm BL @ 1060 nm | 0.001 | 0.002 | 0.003 | 0.008 | 0.023 | 0.087 | 6.931 |
| 30 mm BL @ 1060 nm | 0.000002 | 0.000005 | 0.000011 | 0.000034 | 0.00012 | 0.00058 | 0.114 |

TABLE 2C

| Parameter | Example 8C | Example 9C | Example 10C | Example 11C | Example 12C | Example 13C | Example 14C |
|---|---|---|---|---|---|---|---|
| $\Delta_1$ (% $\Delta$) | 0.33 | 0.3 | 0.27 | 0.24 | 0.21 | 0.18 | 0.15 |
| $r_1$ (microns) | 3.70 | 3.9 | 4.1 | 4.35 | 4.65 | 5 | 5.5 |
| $\alpha$ | 12 | 12 | 12 | 12 | 12 | 12 | 12 |
| $\Delta_2$ (% $\Delta$) | 0.00 | 0.00 | 0.00 | 0.00 | 0.00 | 0.00 | 0.00 |
| $r_2$ (microns) | 10 | 10 | 10 | 10 | 10 | 10 | 10 |
| $\Delta_3$ (% $\Delta$) | −0.25 | −0.25 | −0.25 | −0.25 | −0.25 | −0.25 | −0.25 |
| $r_3$ (microns) | 16 | 16 | 16 | 16 | 16 | 16 | 16 |
| $\Delta_4$ (% $\Delta$) | 0.00 | 0.00 | 0.00 | 0.00 | 0.00 | 0.00 | 0.00 |
| $r_4$ (microns) | 62.5 | 62.5 | 62.5 | 62.5 | 62.5 | 62.5 | 62.5 |
| MFD @ 1060 nm | 7.47 | 7.84 | 8.25 | 8.73 | 9.3 | 9.96 | 10.79 |
| MFD @1550 nm | 10.20 | 10.6 | 11.06 | 11.54 | 12.08 | 12.69 | 13.36 |
| $A_{eff}$ @ 1060 nm | 43.7 | 48.2 | 53.5 | 60.0 | 68.2 | 78.6 | 93.1 |
| $A_{eff}$ @ 1550 nm | 77.9 | 84.4 | 91.8 | 100.6 | 111.0 | 123.5 | 138.9 |
| D @1060 nm | −33.13 | −32.49 | −31.94 | −31.32 | −30.66 | −30 | −29.2 |
| D @1550 nm | 15.48 | 16.56 | 17.52 | 18.49 | 19.42 | 20.26 | 21 |
| DS @ 1060 nm | 0.1700 | 0.1720 | 0.173 | 0.174 | 0.176 | 0.177 | 0.177 |
| DS @ 1550 nm | 0.0659 | 0.0659 | 0.0659 | 0.0656 | 0.065 | 0.0648 | 0.064 |
| LP11 Cutoff | 1011 | 1013 | 1006 | 1001 | 994 | 981 | 972 |
| LL @ 1060 nm | 0.0028 | 0.0034 | 0.0045 | 0.0085 | 0.0132 | 0.021 | 0.493 |
| LL @ 1550 nm | 1.23 | 1.75 | 2.64 | 4.09 | 6.8 | 12.8 | 30.21 |
| Pin Array @ 1060 nm | 0.115 | 0.138 | 0.183 | 0.358 | 0.547 | 0.839 | 21.1 |
| Pin Array @ 1550 nm | 52.77 | 69.27 | 95.15 | 127 | 170 | 230 | 303 |
| Core LP11 cutoff | 1044 | 1049 | 1046 | 1047 | 1047 | 1042 | 1046 |
| Core MFD @ 1060 nm | 7.48 | 7.85 | 8.28 | 8.78 | 9.38 | 10.13 | 11.11 |
| Cable Cutoff | 1003 | 1008 | 1005 | 1006 | 1006 | 1001 | 1005 |
| $V_{Trench}$ | −39.0 | −39.0 | −39.0 | −39.0 | −39 | −39 | −39 |
| 10 mm BL @ 1060 nm | 0.17 | 0.29 | 0.57 | 1.21 | 3.02 | 10.25 | 43.24 |
| 15 mm BL @ 1060 nm | 0.005 | 0.008 | 0.017 | 0.040 | 0.109 | 0.421 | 2.059 |
| 20 mm BL @ 1060 nm | 0.0001 | 0.0002 | 0.0005 | 0.0013 | 0.0040 | 0.0173 | 0.0980 |
| 30 mm BL @ 1060 nm | 0.000001 | 0.000003 | 0.000008 | 0.000025 | 0.000093 | 0.0006 | 0.0045 |

TABLE 3C

| Parameter | Example 15C | Example 16C | Example 17C | Example 18C | Example 19C | Example 20C | Example 21C |
|---|---|---|---|---|---|---|---|
| $\Delta_1$ (% $\Delta$) | 0.33 | 0.3 | 0.27 | 0.24 | 0.21 | 0.18 | 0.15 |
| $r_1$ (microns) | 3.50 | 3.7 | 3.9 | 4.15 | 4.4 | 4.75 | 5.25 |
| $\alpha$ | 12 | 12 | 12 | 12 | 12 | 12 | 12 |

TABLE 3C-continued

| Parameter | Example 15C | Example 16C | Example 17C | Example 18C | Example 19C | Example 20C | Example 21C |
|---|---|---|---|---|---|---|---|
| $\Delta_2$ (% $\Delta$) | 0.00 | 0.00 | 0.00 | 0.00 | 0.00 | 0.00 | 0.00 |
| $r_2$ (microns) | 10 | 10 | 10 | 10 | 10 | 10 | 10 |
| $\Delta_3$ (% $\Delta$) | −0.30 | −0.30 | −0.30 | −0.30 | −0.30 | −0.30 | −0.30 |
| $r_3$ (microns) | 17 | 17 | 17 | 17 | 17 | 17 | 17 |
| $\Delta_4$ (% $\Delta$) | 0.00 | 0.00 | 0.00 | 0.00 | 0.00 | 0.00 | 0.00 |
| $r_4$ (microns) | 62.5 | 62.5 | 62.5 | 62.5 | 62.5 | 62.5 | 62.5 |
| MFD @ 1060 nm | 7.34 | 7.71 | 8.12 | 8.6 | 9.13 | 9.8 | 10.61 |
| MFD @1550 nm | 10.23 | 10.6 | 11.02 | 11.48 | 11.99 | 12.55 | 13.17 |
| $A_{\it{eff}}$ @ 1060 nm | 41.9 | 46.3 | 51.4 | 57.8 | 65.3 | 75.3 | 89.35 |
| $A_{\it{eff}}$ @ 1550 nm | 78.0 | 84.0 | 91.1 | 99.4 | 109.1 | 120.7 | 135 |
| D @1060 nm | −34.10 | −33.3 | −32.6 | −31.84 | −31.16 | −30.33 | −29.39 |
| D @1550 nm | 15.11 | 16.3 | 17.38 | 18.45 | 19.38 | 20.32 | 21.2 |
| DS @ 1060 nm | 0.1700 | 0.1710 | 0.173 | 0.174 | 0.176 | 0.177 | 0.178 |
| DS @ 1550 nm | 0.0683 | 0.068 | 0.0675 | 0.067 | 0.067 | 0.066 | 0.065 |
| LP11 Cutoff | 960 | 964 | 960 | 958 | 945 | 937 | 933 |
| LL @ 1060 nm | 0.0016 | 0.0053 | 0.004 | 0.013 | 0.0127 | 0.015 | 0.361 |
| LL @ 1550 nm | 1.34 | 1.789 | 2.54 | 3.71 | 5.9 | 10.17 | 21.1 |
| Pin Array @ 1060 nm | 0.074 | 0.256 | 0.187 | 0.651 | 0.614 | 0.687 | 17.86 |
| Pin Array @ 1550 nm | 64.41 | 79.04 | 101.9 | 128 | 170 | 218.2 | 274.1 |
| Core LP11 cutoff | 988 | 996 | 996 | 999 | 991 | 990 | 999 |
| Core MFD @ 1060 nm | 7.36 | 7.73 | 8.15 | 8.65 | 9.23 | 9.98 | 10.95 |
| Cable Cutoff | 997 | 1005 | 1005 | 1008 | 1000 | 999 | 1008 |
| $V_{Trench}$ | −56.7 | −56.7 | −56.7 | −56.7 | −56.7 | −56.7 | −56.7 |
| 10 mm BL @ 1060 nm | 0.073 | 0.120 | 0.236 | 0.505 | 1.440 | 4.913 | 20.090 |
| 15 mm BL @ 1060 nm | 0.002 | 0.004 | 0.008 | 0.018 | 0.056 | 0.218 | 1.030 |
| 20 mm BL @ 1060 nm | 6.01E−05 | 1.10E−04 | 2.48E−04 | 6.20E−04 | 2.20E−03 | 9.65E−03 | 5.28E−02 |
| 30 mm BL @ 1060 nm | 1.42E−06 | 2.93E−06 | 7.82E−06 | 2.37E−05 | 1.09E−04 | 6.51E−04 | 5.06E−03 |

The optical fiber 6 according to Example C can also have one or more of the following properties.

In an example, the outer radius $r_1$ of core region 10 is in the range from 3.5 to 5.5 microns and the relative refractive index $\Delta_1$ is in the range from 0.15% to 0.30%.

In an example, the outer radius $r_3$ of the trench region 30 is in the range from 12 to 20 microns, the relative refractive index $\Delta_3$ is less than −0.2%, and the trench volume is at least 30% $\Delta\mu m^2$.

In an example, the outer radius $r_4$ of the outer cladding region 40 is at least 60 microns and said relative refractive index $\Delta_4$ is in the range from −0.05% to 0.10%.

In an example, optical fiber 6 has an effective area $A_{\it{eff}}$ at 1060 nm of at least 50 micron.

In an example, the inner cladding region 20 has an outer radius $r_2$ in the range from 5 to 20 microns and a relative refractive index $\Delta_2$ in the range from −0.10% to 0.20%, with the depressed cladding index region 30 surrounding said inner cladding region.

In an example, the inner cladding region 20 has an outer radius $r_2$ in the range from 7 to 15 microns and a relative refractive index $\Delta_2$ in the range from −0.05% to 0.10%.

In an example, the outer radius $r_3$ of trench region 30 in the range from 12 to 20 microns, the relative refractive index $\Delta_3$ is less than −0.20%, and the trench volume is at least 35% $\Delta$-micron$^2$.

In an example, the outer radius $r_4$ of the outer cladding region 40 is at least 60 microns and said relative refractive index $\Delta_4$ is in the range from −0.05% to 0.10%.

In an example, the bend loss BL at 1060 nm and for a 10 mm mandrel is less than or equal to than 70 dB/turn or less than or equal to 5 dB/turn. In another example, the bend loss BL at 1060 nm and for a 15 mm mandrel is less than or equal to than 5 dB/turn or less than 2 dB/turn, or less than or equal to 1 dB/turn. Also in an example, the bend loss BL at 1060 nm for a 20 mm mandrel is less than or equal to 7 dB/turn or less than or equal to 0.1 dB/turn. Also in an example, the bend loss BL at 1060 nm for a 30 mm mandrel is less than or equal to 0.15 dB/turn or less than or equal to 0.005 dB/turn.

Integrated Systems and Optical Communication Systems

In addition to the large effective area optical fibers disclosed herein, the present disclosure extends to integrated systems that incorporate the fibers, and optical communication systems that employ the integrated systems.

Figure 3A:
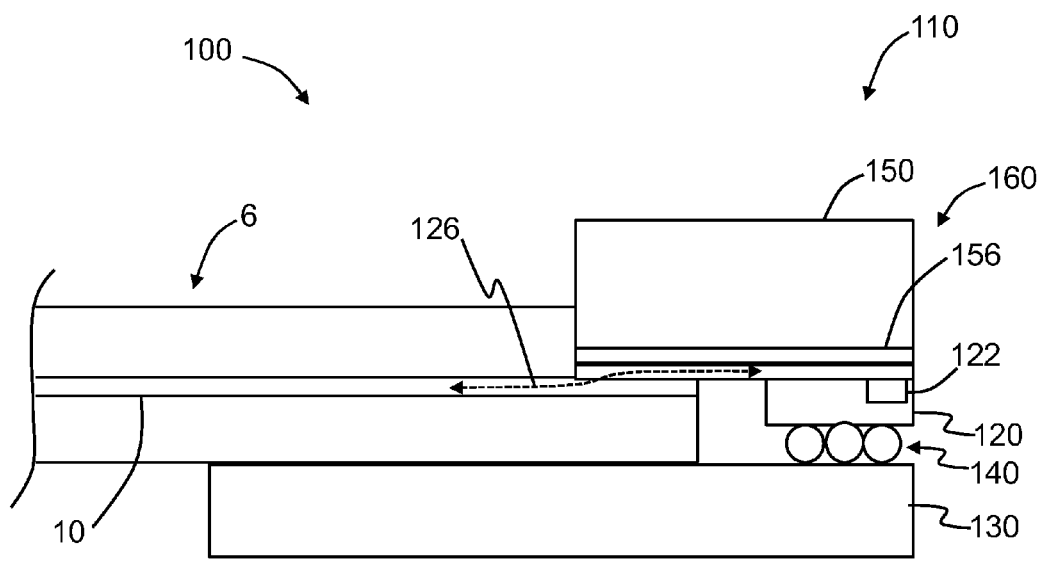
FIG. 3A is close-up side view of an example integrated system that utilizes the large effective area optical fiber disclosed herein.

FIG. 3A is a side view of an example integrated system 100 that includes an example VCSEL-based transceiver 110 and fiber 6 as disclosed herein. The example transceiver 110 includes a photonic integrated circuit (PIC) 120 with an active device 122. The active device 122 may comprise a light source (e.g., LED, vertical cavity surface-emitting laser (VCSEL), distributed feedback (DFB) laser or semiconductor laser) and a light receiver (e.g., a photodetector). The PIC 120 is electrically connected to a printed circuit board (PCB) 130 via electrical connections 140 shown by way of example in the form of a ball-grid array. A waveguide structure 150 that includes at least one waveguide 156 is operably disposed adjacent PIC 120 so that light 126 emitted by a light-emitting active device 122 is coupled into the waveguide. The waveguide 156 is shown by way of example as being edge-coupled to fiber 6 so that light 126 can couple between the waveguide and the fiber. The waveguide structure 150 and PIC 120 constitute a photonic device 160.

In one embodiment, the active device 122 operates at or near (e.g., to within a few nanometers of) one of the aforementioned operating wavelengths $\lambda$, i.e. at or near 850 nm or at or near 980 nm or at or near 1060 nm. Further in an example, the active device 122 emits light in the range from 800 nm to 900 nm or in the range from 940 nm to 1020 nm or in the range from 1020 nm to 1100 nm, depending on the operating wavelength of fiber 6. In an example, the active device 122 is a single-moded VCSEL.

The integrated system 100 may also include peripheral devices such as modulators, detectors, multiplexers, demultiplexers, etc., as known in the art.

The large MFD provided by fiber 6 reduces coupling losses between the fiber and waveguide 156 of photonic device 160. For example, coupling losses of standard G.652 single mode optical fibers with silicon photonics chip devices can be greater than 2 dB. Coupling losses between fiber 6 as disclosed and waveguide 156 of photonic device 160 of the transceiver 110 can be less than 2 dB, less than 1 dB or even less than 0.5 dB.

Figure 3B:
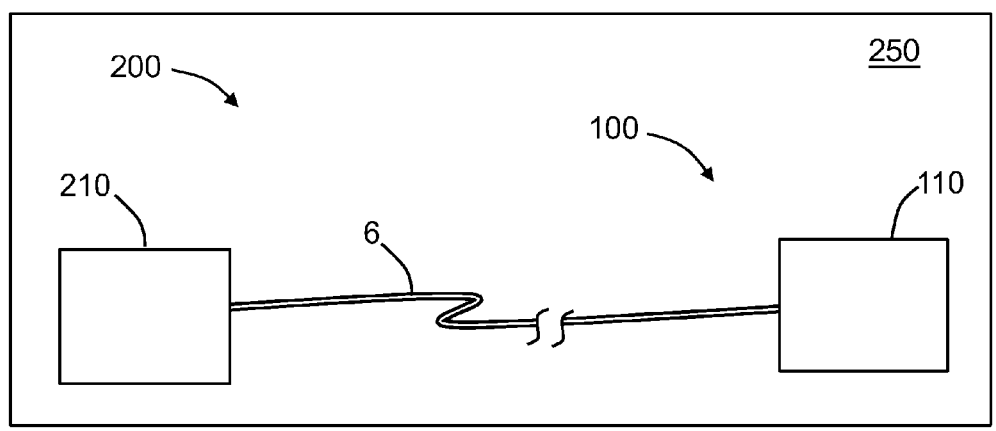
FIG. 3B is a schematic diagram of an example optical communication system that includes the integrated system of FIG. 3A operably connected to a remote device, wherein the optical system is shown by way of example as being deployed in a data center.

FIG. 3B is a schematic diagram of an example optical communication system 200 that includes the integrated system 100, with the fiber 6 thereof optically connected to a remote device 210. In an example, optical communication system 200 is deployed within a data center 250 and the remote device 210 is a data-center device, such as a server (e.g., rack-mounted server) or other data-center component such as a router, a switch, etc.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. An optical fiber comprising:
    a core region comprising an outer radius $r_1$ in the range from 3.0 to 6.0 microns and a relative refractive index $\Delta_{1max}$ in the range from 0.12% to 0.35%;
    a depressed index cladding region surrounding said core region, said depressed index cladding region comprising an outer radius $r_3$ and a relative refractive index $\Delta_3$ less than −0.1%, and a trench volume of at least 20% $\Delta$-micron$^2$;
    an outer cladding region surrounding said depressed index cladding region, said outer cladding region comprising an outer radius $r_4$; and
    wherein said optical fiber has a mode field diameter (MFD) at 850 nm≥6.0 microns, a cable cutoff wavelength≤850 nm, an effective area at 850 nm of at least 30 micron$^2$, and a bending loss at 850 nm as determined by the mandrel wrap test using a mandrel comprising a diameter of 15 mm of ≤1.0 dB/turn.

2. The optical fiber of claim 1, wherein said outer radius $r_1$ is in the range from 3.0 to 5.0 microns and said relative refractive index $\Delta_1$ is in the range from 0.15% to 0.3%.

3. The optical fiber of claim 2, wherein said outer radius $r_3$ is in the range from 12 to 20 microns, said relative refractive index $\Delta_3$ is less than −0.1%, and said trench volume is at least 20% $\Delta\mu m^2$.

4. The optical fiber of claim 3, wherein said outer radius $r_4$ is at least 60 microns and said relative refractive index $\Delta_4$ is in the range from −0.05% to 0.10%.

5. The optical fiber of claim 1, wherein said optical fiber has an effective area at 850 nm of at least 40 micron$^2$.

6. The optical fiber of claim 1, further comprising:
    an inner cladding region surrounding said core region, said inner cladding region comprising an outer radius $r_2$ in the range from 5 to 20 microns and a relative refractive index $\Delta_2$ in the range from −0.10% to 0.20%, said depressed cladding index region surrounding said inner cladding region.

7. The optical fiber of claim 6, wherein said inner cladding region has an outer radius $r_2$ in the range from 7 to 15 microns and a relative refractive index $\Delta_2$ in the range from −0.05% to 0.10%.

8. The optical fiber of claim 7, wherein said outer radius $r_3$ is in the range from 12 to 20 microns, said relative refractive index $\Delta_3$ is less than −0.1%, and said trench volume is at least 20% $\Delta$-micron$^2$.

9. The optical fiber of claim 8, wherein said outer radius $r_4$ is at least 60 microns and said relative refractive index $\Delta_4$ is in the range from −0.05% to 0.10%.

10. An integrated system comprising:
    the optical fiber according to claim 1; and
    a vertical-cavity surface-emitting laser (VCSEL) optically coupled to the optical fiber and that emits light at one or more wavelengths between 800 nm and 900 nm.

11. An optical fiber comprising:
    a core region comprising an outer radius $r_1$ in the range from 3.0 to 6.0 microns and a relative refractive index $\Delta_{1max}$ in the range from 0.12% to 0.35%;
    a depressed index cladding region surrounding said core region, said depressed index cladding region comprising an outer radius $r_3$, a relative refractive index $\Delta_3$ less than −0.15%, and a trench volume of at least 25% $\Delta$-micron$^2$;
    an outer cladding region surrounding said depressed index cladding region, said outer cladding region comprising an outer radius $r_4$; and
    wherein said optical fiber has a mode field diameter (MFD) at 980 nm≥6.5 microns, a cable cutoff wavelength≤980 nm, an effective area at 980 nm of at least 40 micron, and a bending loss at 980 nm as determined by the mandrel wrap test using a mandrel comprising a diameter of 15 mm of ≤1.0 dB/turn.

12. The optical fiber of claim 11, wherein said outer radius $r_1$ is in the range from 3.5 to 5.5 microns and said relative refractive index $\Delta_1$ is in the range from 0.15% to 0.30%.

13. The optical fiber of claim 12, wherein said outer radius $r_3$ is in the range from 12 to 20 microns, said relative refractive index $\Delta_3$ is less than −0.15%, and said trench volume is at least 30% $\Delta\mu m^2$.

14. The optical fiber of claim 13, wherein said outer radius $r_4$ is at least 60 microns and said relative refractive index $\Delta_4$ is in the range from −0.05% to 0.10%.

15. The optical fiber of claim 11, wherein said optical fiber has an effective area at 980 nm of at least 50 micron$^2$.

16. The optical fiber of claim 11, further comprising:
    an inner cladding region surrounding said core region, said inner cladding region comprising an outer radius $r_2$ in the range from 5 to 15 microns and a relative refractive index $\Delta_2$ in the range from −0.10% to 0.20%, said depressed cladding index region surrounding said inner cladding region.

17. The optical fiber of claim 16, wherein said inner cladding region has an outer radius $r_2$ in the range from 7 to 15 microns and a relative refractive index $\Delta_2$ in the range from −0.05% to 0.10%.

18. The optical fiber of claim 17, wherein said outer radius $r_3$ is in the range from 12 to 20 microns, said relative refractive index $\Delta_3$ is less than −0.15%, and said trench volume is at least 30% $\Delta$-micron$^2$.

19. The optical fiber of claim 18, wherein said outer radius $r_4$ is at least 60 microns and said relative refractive index $\Delta_4$ is in the range from −0.05% to 0.10%.

20. An integrated system comprising
    the optical fiber according to claim 11; and
    a vertical-cavity surface-emitting laser (VCSEL) optically coupled to the optical fiber and that emits light at one or more wavelengths between 940 nm and 1020 nm.

21. An optical fiber comprising:
    a core region comprising an outer radius $r_1$ in the range from 3.0 to 6.0 microns and a relative refractive index $\Delta_{1max}$ in the range from 0.12% to 0.35%;

a depressed index cladding region surrounding said core region, said depressed index cladding region comprising a radius $r_3$, a relative refractive index $\Delta_3$ less than −0.1%, and a trench volume of at least 20% Δ-micron$^2$;

an outer cladding region surrounding said depressed index cladding region, said outer cladding region comprising an outer radius $r_4$; and wherein said optical fiber has a mode field diameter (MFD) at 1060 nm≥7.0 microns, a cable cutoff wavelength≤1060 nm, an effective area at 1060 nm of at least 40 micron$^2$, and a bending loss at 1060 nm as determined by the mandrel wrap test using a mandrel comprising a diameter of 15 mm of ≤1.0 dB/turn.

22. The optical fiber of claim 21, wherein said outer radius $r_1$ is in the range from 3.5 to 5.5 microns and said relative refractive index $\Delta_1$ is in the range from 0.15% to 0.30%.

23. The optical fiber of claim 22, wherein said outer radius $r_3$ is in the range from 12 to 20 microns, said relative refractive index $\Delta_3$ is less than −0.2%, and said trench volume is at least 30% Δμm$^2$.

24. The optical fiber of claim 23, wherein said outer radius $r_4$ is at least 60 microns and said relative refractive index $\Delta_4$ is in the range from −0.05% to 0.10%.

25. The optical fiber of claim 21, wherein said optical fiber has an effective area at 1060 nm of at least 50 micron$^2$.

26. The optical fiber of claim 21, further comprising:
an inner cladding region surrounding said core region, said inner cladding region comprising an outer radius $r_2$ in the range from 5 to 20 microns and a relative refractive index $\Delta_2$ in the range from −0.10% to 0.20%, said depressed cladding index region surrounding said inner cladding region.

27. The optical fiber of claim 26, wherein said inner cladding region has an outer radius $r_2$ in the range from 7 to 15 microns and a relative refractive index $\Delta_2$ in the range from −0.05% to 0.10%.

28. The optical fiber of claim 27, wherein said outer radius $r_3$ is in the range from 12 to 20 microns, said relative refractive index $\Delta_3$ is less than −0.20%, and said trench volume is at least 35% Δ-micron$^2$.

29. The optical fiber of claim 28, wherein said outer radius $r_4$ is at least 60 microns and said relative refractive index $\Delta_4$ is in the range from −0.05% to 0.10%.

30. An integrated system comprising
the optical fiber according to claim 21; and
a vertical-cavity surface-emitting laser (VCSEL) optically coupled to the optical fiber and that emits light at one or more wavelengths between 1020 and 1100 nm.

* * * * *

UNITED STATES PATENT AND TRADEMARK OFFICE
CERTIFICATE OF CORRECTION

PATENT NO. : 9,995,873 B2
APPLICATION NO. : 15/658813
DATED : June 12, 2018
INVENTOR(S) : Scott Robertson Bickham et al.

Page 1 of 1

It is certified that error appears in the above-identified patent and that said Letters Patent is hereby corrected as shown below:

In the Claims

In Column 22, Line 26, Claim 11, delete "40 micron," and insert -- 40 micron$^2$, --, therefor.

Signed and Sealed this
First Day of September, 2020

Andrei Iancu
*Director of the United States Patent and Trademark Office*